Feb. 10, 1970    J. D. GOODWIN    3,494,040
SEWER'S MARKING TOOL
Filed July 19, 1968
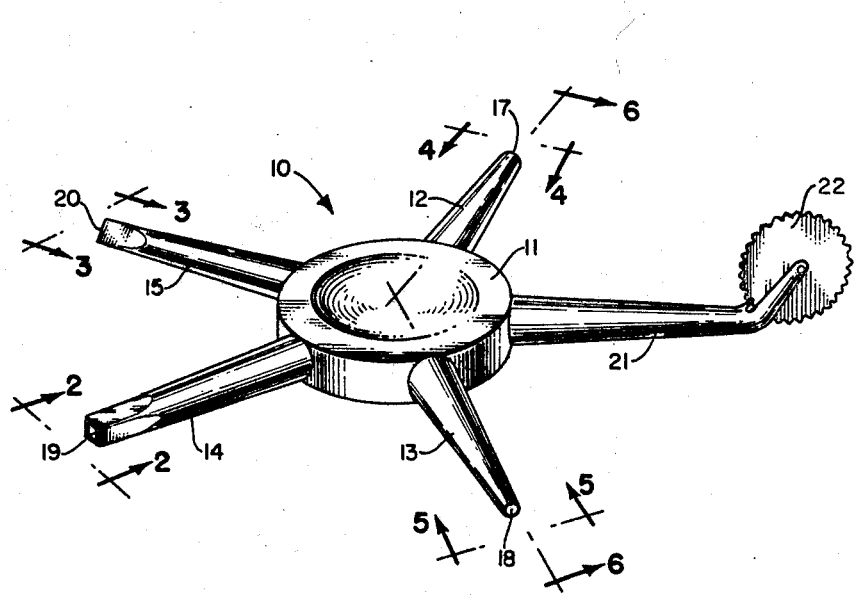
FIG. 1.
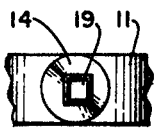    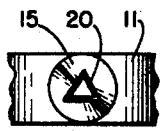    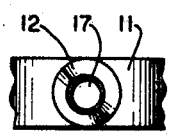    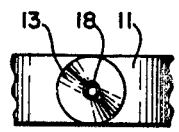
FIG. 2.        FIG. 3.        FIG. 4.        FIG. 5.
FIG. 6.
INVENTOR.
JEWEL D. GOODWIN
BY
ATTORNEYS

3,494,040
SEWER'S MARKING TOOL
Jewel D. Goodwin, New Orleans, La.
(1306 SE. 12th Terrace, Deerfield Beach, Fla. 33441)
Filed July 19, 1968, Ser. No. 746,193
Int. Cl. B431 *13/00*
U.S. Cl. 33—18                                                        1 Claim

ABSTRACT OF THE DISCLOSURE

A center body having a plurality of radiating arms, the outer end of each said arm being shaped to the configuration of one of the symbols that is standard in all dressmaking patterns, and an additional radiating arm carrying on its end a marking wheel of the standard type.

---

The invention comprises generally a sewer's marking tool for reproducing on cloth the various coded instructions that are on patterns, and more specifically, in collaboration with dressmaker's carbon, easily and quickly impressing coded symbols onto the cloth as indicated on a pattern.

Heretofore, in making a garment, the sewer, seamstress, or dressmaker would pin the various pieces of pattern onto the cloth and cut around them for the shape of the piece. On the sides of the pattern, various coded marks or symbols were placed to indicate what should be done by the seamstress at that point. In order for these instructions to be displayed, they would either be laboriously transferred to the cloth by hand tracing or the pattern was left pinned to the cloth until actually used to compose the garment. The pattern could also be lifted from the cloth in order to make the marks on the cloth, with the result that accuracy in marking was a matter of estimate.

It is an object of the invention to provide an easy way of marking precisely on the cloth the coded symbols as they appear on all patterns, thus making it unnecessary to trace the symbols or to keep the pattern pinned to the cloth until the actual sewing takes place or displacing it to make the symbols directly on the cloth by estimation.

Other objects and a fuller understanding of the invention may be had by referring to the specification and claims and drawings in which:

FIGURE 1 is a plan view of the invention,

FIGURE 2 is an end view of one of the arms having its outer end shaped into one of the indicating symbols, FIGURE 3 is a similar view to FIGURE 2 showing a second arm and symbol, FIGURE 4 is a similar view of a third arm and symbol, and FIGURE 5 is a similar view of a fourth arm and symbol, FIGURE 6 is a cross-sectional view taken along section line 6—6.

The invention 10 comprises a circular central body 11 having arms 12–15 radiating outwardly therefrom. The end of each of the arms 10–14 is shaped to reproduce one of the symbols that are standard coded instructions on all patterns. The coded symbols are (1) a large circle 17 which indicates a point to cut or stitched to, (2) a small circle, 18, a succession of which indicates a sewing line or matching line, (3) a rectangle 19 which indicates matching points on two adjacent pieces of cloth, and (4) a triangle, 20, the use of which is indicated on the pattern being used. A fifth arm, 21, carries on the end of the usual marking wheel, 22. The arms 12–16 are equidistantly spaced around the perimeter of the central body which is slightly concave on each side for ease in holding. The tool is designed to fit the hand and can be made of any convenient material that is light and strong and is capable of being shaped on its outer ends in the form of the symbols indicated. Aluminum makes a suitable material and any hard plastic could be used likewise. The tool is used in collaboration with dressmaker's carbon paper.

In use, the tool is grasped in one hand and a piece of dressmaker's carbon paper (not shown) is inserted between the pattern and the cloth to be marked and the end of a suitable radiating arm having the necessary symbol or the marking wheel on its end is pressed against the pattern where the symbol or line is located, thereby accurately stenciling coded instruction or line thereon. When all the symbols and lines that appear on the pattern are impressed on the cloth, the pattern may be removed and the cloth laid aside until all pieces of material have been cut and marked as indicated on the pattern. They can be fitted and sewn together as indicated on the pattern by the marked symbols.

The invention has been described with a certain degree of particularity and it should be understood that the present disclosure has been made only by way of example and that numerous changes in details of construction and in the combinations and arrangements of parts may be resorted to without departing from the spirit and scope of the invention as here and after claimed.

What is claimed is:

1. A sewer's marking tool for use with clothes patterns and dressmaker carbon marking paper to reproduce a finite number of pattern sewing instructions on the cloth for the clothes made from said pattern, said instructions being indicated by symbols on said pattern, and said tool comprising in new combination: a center base having an outer perimeter, said base serving the dual use of being a mount and a handle; a plurality of arms, one for each said sewing instruction symbol, radially mounted and spaced apart on and around said outer perimeter to radiate outwardly therefrom; instruction symbols, permanently arranged and instantly available individually, respectively fixed to the respective ends of said arms for pressing against corresponding instruction symbols on said pattern when said pattern is laid out on said cloth with said carbon marking paper therebetween to rapidly and accuratelay reproduce said pattern instructions on said cloth, wherein said instruction symbols respectively comprise a square, a triangle, a circle, a smaller circle and a broken line, the first four of which are defined in relief respectively on the respective outer ends of four of said arms in planes normal to the direction of radiation of their respective arms, and a marking wheel is mounted for rotation on the end of a fifth arm for rotation in a plane normal to the plane of said base for making said broken line.

References Cited

UNITED STATES PATENTS

| | | | |
|---|---|---|---|
| 195,624 | 9/1877 | Major | 101—29 |
| 284,573 | 9/1883 | Purdy. | |
| 357,587 | 2/1887 | Erskine | 101—368 |
| 1,393,170 | 10/1921 | Schmidinger | 101—29 |
| 1,751,001 | 3/1930 | Guth | 33—10 X |
| 1,982,790 | 12/1934 | Harbo | 101—368 |
| 2,449,810 | 9/1948 | Guenther | 33—184.6 |
| 2,839,993 | 6/1958 | Orthin | 101—368 |
| 3,403,623 | 10/1968 | Blackwood | 33—189 |

FOREIGN PATENTS

| | | |
|---|---|---|
| 507,734 | 7/1920 | France. |
| 288,940 | 6/1953 | Switzerland. |

HARRY N. HAROIAN, Primary Examiner

U.S. Cl. X.R.

101—29, 368